(12) United States Patent
Hollitt et al.

(10) Patent No.: US 6,582,670 B1
(45) Date of Patent: Jun. 24, 2003

(54) FEED PROCESSING FOR IMPROVED ALUMINA PROCESS PERFORMANCE

(75) Inventors: Michael Hollitt, Graceville (AU); Stephen Grocott, Sunnybank Hills (AU); John Peter Kisler, Wendouree (AU); Colin John Beeby, Cheltenham (AU)

(73) Assignee: Comalco Aluminum Limited, Brisbane (AU)

( * ) Notice: Subject to any disclaimer, the term of this patent is extended or adjusted under 35 U.S.C. 154(b) by 0 days.

(21) Appl. No.: 09/787,809

(22) PCT Filed: Sep. 28, 1999

(86) PCT No.: PCT/AU99/00831

§ 371 (c)(1),
(2), (4) Date: Jun. 18, 2001

(87) PCT Pub. No.: WO00/18685

PCT Pub. Date: Apr. 6, 2000

(30) Foreign Application Priority Data

Sep. 30, 1998 (AU) .............................................. PP6241

(51) Int. Cl.[7] .............................................. C22B 21/00
(52) U.S. Cl. .................. 423/121; 423/122; 423/123; 423/124; 423/127; 423/130; 423/625
(58) Field of Search ................. 423/121, 122, 423/123, 124, 127, 130, 625, 629

(56) References Cited

U.S. PATENT DOCUMENTS 2,915,365 A  12/1959 Saussol
3,265,465 A  8/1966 Turpin et al.
5,141,734 A * 8/1992 Misra et al.

FOREIGN PATENT DOCUMENTS

| FR | 1 077 116 A | 11/1954 |
| FR | 1 106 778 A | 12/1955 |
| FR | 1 364 940 A | 5/1964 |
| GB | 2 257 695 A | 1/1993 |

\* cited by examiner

*Primary Examiner*—Steven Bos
(74) *Attorney, Agent, or Firm*—Miles & Stockbridge P.C.; John C. Kerins

(57) ABSTRACT

A process is provided for the treatment of an alumina process feedstock prior to transferring the treated feedstock to an alumina process for extracting refined alumina from the treated feedstock. The treatment process includes: (a) heating the alumina process feedstock to a temperature of 400° C. to 650° C. by direct contact with combustion gas, and (b) cooling the heated feedstock to a temperature at which it can be handled and fed to the alumina process. The treatment process also includes controlling the contact time of the alumina process feedstock at temperatures in step (a) to ensure decomposition of alumina trihydrate and alumina monohydrate. The process also includes: (i) limiting the maximum temperature of incoming gas to a stage of the process in which the alumina process feedstock reaches the above temperature range of 400° C. to 650° C. (which is to be considered to be the highest temperature stage, and/or (ii) limiting the heat input into the highest temperature stage by ensuring that the main thermal load associated with thermal dehydration of the alumina process feedstock is taken up in earlier stage or stages into which combustion gas, at a temperature above that of the inlet gases of the highest temperature stage, is added.

25 Claims, 1 Drawing Sheet

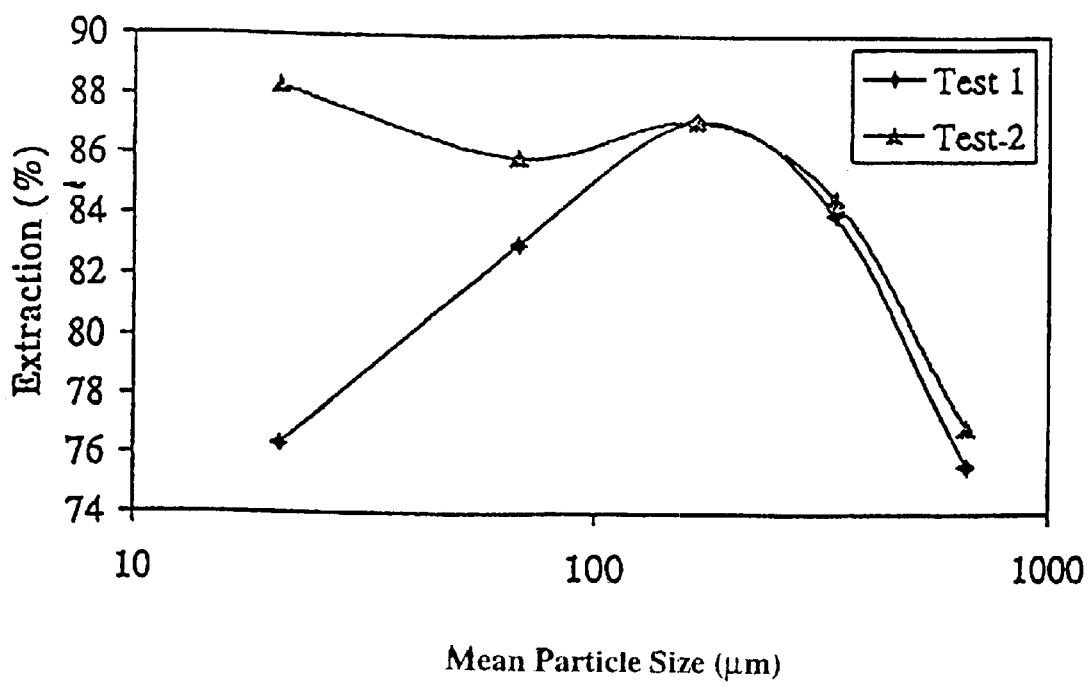

FEED PROCESSING FOR IMPROVED ALUMINA PROCESS PERFORMANCE

This invention relates to the improvement of the mineralogical and chemical composition of naturally occurring and synthetic alumina process feedstocks. The invention is particularly suited to the enhancement of boehmitic bauxites used in the production of alumina and alumina chemicals, especially by the Bayer process.

Embodiments of the present invention have the common feature of heating of the alumina process feedstock to bring about thermal dehydration and removal of organic carbon or conversion of organic carbon to a form which is not extractable in the aqueous phase digestion of the alumina process feedstock. Additional steps may be employed as will be described below.

The dominant technology for the extraction of refined alumina from alumina process feedstocks is the Bayer process. In the Bayer process alumina is extracted from alumina process feedstock (most frequently in the form of bauxite) by contacting the milled alumina process feedstock with hot caustic solution, generally under pressure, to dissolve alumina therefrom. If the alumina process feedstock contains mainly gibbsite (a mineral form of alumina trihydrate), extraction of alumina from the bauxite may be conducted using a caustic solution at a temperature generally in the range 100 to 175° C. If the alumina process feedstock contains mainly boehmite, or diaspore (mineral forms of alumina monohydrate) higher temperatures, in the order of 200 to 300° C. are generally required. The higher temperature digestion is required in these cases because the monohydrate forms act to cause instability of caustic solutions containing the high levels of dissolved alumina desired for subsequent processing unless there is a high degree of elimination of these forms by digestion at temperatures where such liquors will be stable. High temperature digestion comes with significant equipment cost disadvantages, in a much larger liquor heating and flashing system (e.g. 11 stages compared with 3) and in more expensive materials and specifications for construction. For mixed trihydrate and monohydrate forms, as is the case for many naturally occurring bauxites, a double digestion process, in which residues from a lower temperature first stage digest are further digested in a higher temperature second stage digest, may be used.

After digestion the digestion solid residue/pregnant caustic liquor mixture is brought back to atmospheric pressure by flashing to boil off water. The solid residue (usually referred to as red mud) is separated from the pregnant, caustic aluminate bearing liquor, usually by a combination of settling or filtration and washing, with both pregnant liquor and wash liquor clarified through pressure filters. The clarified combined liquor is fed to a precipitation circuit where it is cooled and seeded with solid particles of alumina trihydrate to induce precipitation of solid alumina trihydrate from the liquor. The resulting precipitation slurry is separated into a spent liquor stream and solids streams graded by particle size, by settling, cycloning or filtration, or combination of these processes. Coarse solids represent product, and are washed and transferred to a calcination stage where they are calcined to produce alumina. Intermediate and fine solids are separately returned to the precipitation circuit, frequently after at least crude deliquoring, e.g. in cyclones or filters, for agglomeration and to provide seed.

The fine seed is normally washed prior to recycle to precipitation, either to remove solid phase oxalate precipitated with the alumina (which would interfere with the incorporation of the fine material into composite coarse particles in the precipitation process), or to remove organic compounds which would otherwise render the seed less active.

The spent liquor is returned to the digestion step, normally after some reconcentration by evaporation, where it is contacted with further milled alumina process feedstock.

The Bayer process has been used commercially for about 100 years and is well known to persons skilled in the art.

Alumina process feedstocks, particularly bauxites, include a range of impurities in addition to the hydrated forms of alumina. The main impurities are compounds of iron, titania and silica, which, while having various deleterious effects in the Bayer process, including on consumables such as flocculants, lime and caustic soda, and on scale formation and product quality, deport predominantly to the solid mud residue.

Despite its presence at only low levels in typical Bayer process feeds, extractable organic carbon (0.02% to 0.35%) is an impurity of major significance. Organic compounds, carbonates and oxalates derived from organic carbon in the feedstock have the capacity to accumulate in the circulating liquors, sequestering caustic soda which could otherwise have delivered alumina from digestion to precipitation, and therefore severely impacting on the productivity of the process. While carbonates and oxalates can be removed from the circuit by causticisation of various wash liquors or precipitates with lime, a reduction in the level of other organic carbon derivatives can only be achieved by either pressure oxidation (which comes with explosion hazards and generates large quantities of oxalate and carbonate which then must be removed), or bleeding off of caustic solutions, for either neutralisation and disposal (which is major economic burden through caustic make-up costs) or for concentration by evaporation followed by destruction by combustion (which has high energy and capital costs). Organic compounds also interfere with the precipitation process (by adsorption onto active sites on the seed, having a seed poisoning effect) and carry soda as a contaminant into the precipitated product. Oxalate derived from organic carbon is relatively insoluble, and can precipitate as sodium oxalate with the alumina trihydrate, interfering with product size, morphology and chemistry, and reducing resistance to particle attrition. Because these effects lead to the necessity to ensure that oxalate is not precipitated in the same precipitation tanks in which fine alumina is to be cemented into composite particles by the early portion of the precipitating alumina hydrate, and because oxalate stability above its solubility is a strong inverse function of liquor strength, the caustic strength available for carrying alumina is also limited in most alumina refineries by the input of oxalate precursors and oxalate generated by oxidation of other organics.

That is, organics in alumina process feeds are in large measure responsible for establishing the limits to productivity in the Bayer process, by setting the maximum level of soda in liquor, determining the extent to which this soda is sequestered from its useful purpose of delivering alumina, and acting as poisons for the precipitation process.

The impact of monohydrate alumina in alumina process feeds in driving the need for high temperature digestion has already been mentioned. Some other impacts of monohydrate alumina should also be mentioned. Digestion of alumina process feeds at high digestion temperatures results in side reactions (such as production of titania phases) which reduce digestion efficiency. For this reason lime addition is frequently made. The consumption rate of lime for this purpose and for causticisation and oxalate destruction is sufficient to justify the construction of dedicated lime kilns in many environments. Also, the digestion temperature is frequently limited by the pressures at which boilers can operate safely and effectively, which results in a greater limitation on liquor alumina concentration for high temperature digestion than for low temperature digestion, given the instability of high alumina concentration liquors in the presence of solid residues which still contain destabilising monohydrate alumina. Thus digestion of monohydrate alumina bearing alumina process feeds is naturally less productive than digestion of alumina bearing feeds with little or no monohydrate alumina. To make up for this shortcoming some alumina processing plants inject alumina bearing feeds having little or no monohydrate alumina into the cooling digestion liquors in the flashing vessels at temperatures and for contact times for which monohydrate alumina in high temperature digestion residues will not quickly cause liquor decomposition. This process is known as sweetening. The process adds significantly to processing complexity, requiring a separate milling and slurrying system for the injected feed having the low content of monohydrate alumina. Since important reactions which result in silica in feedstock forming solid sodium aluminosilicates (and therefore deporting to residues) cannot be completed at the times and temperatures of liquor/solids contact for the injected feedstock the sweetening process also elevates the level of dissolved silica in digestion liquors, causing elevated levels of silica subsequently precipitated with the alumina hydrate, and scaling problems in evaporation, alumina process feedstock slurrying, and liquor and slurry heating. To prevent scaling problems an aluminosilicate seeded desilication operation after hydrate precipitation may be added to the flowsheet.

Further, high temperature digestion results in conversion of a substantial proportion of any quartz in the alumina process feedstock to sodium aluminosilicate, which deports to the digestion residue along with sodium aluminosilicate formed from more reactive forms of silica. Quartz is not significantly digested in low temperature digestion. Alumina process feedstocks having high contents of monohydrate alumina will, for an equivalent quartz and total silica content, consume more caustic soda, requiring greater make up of this expensive chemical. Further, such feedstocks will normally therefore benefit from treatment for the removal of liberated quartz particles prior to supply to the alumina refining process, at a further cost and process complexity, and usually for considerable loss of mineral values.

Another influence of high temperature digestion is the conversion of some iron in the alumina process feedstock to soluble and colloidal forms which are able to pass through the clarifying system and deport in large measure to the precipitated alumina hydrate. The iron content of alumina hydrate, along with the silica content, is an important determinant of the value of the calcined hydrate to aluminium smelter customers, as it affects the quality of high purity metal which can be made. The combination of high iron in clarified liquors (driven by monohydrate alumina in the alumina process feedstock) with low alumina yield in precipitation of alumina hydrate (driven as indicated above by organic impurities in the alumina process feedstock as well as the monohydrate alumina in the alumina process feedstock) is potentially very damaging for product quality, especially when combined with the implications for silica in hydrate of a sweetening process.

It will be apparent from the above discussion of the Bayer alumina refining process that there are two properties of an alumina process feedstock which have the dominant influence on complexity, and productivity in the Bayer process to which it is fed, as well as a significantly negative influence on hydrate product quality and a further negative influence on construction and operating costs, especially consumables costs. The first is the monohydrate alumina content, and the second is the content of extractable organic carbon (including oxalate precursor organics and hydrate seed poisons).

With the exception of processes involving high temperature reaction of the alumina process feedstock with or without reagents at high temperatures (see below) prior art processes for dealing in part with the latter of these problems, namely extractable organic carbon, are universally dependent on the treatment of a side stream of caustic liquors in the Bayer process for removal and destruction of compounds derived from the organic inputs. In one prior art process a side stream of caustic liquor is evaporated and mixed with a stream of alumina bearing dust and recycled solid calcined material before being fed to a high temperature calcination process in which all organic matter is destroyed by pyrolysis and combustion processes. The solid calcined product, consisting primarily of sodium aluminate, is divided into product and recycle components. The product component is either recycled into the Bayer process for dissolution, thereby recovering alumina and soda components, or used for dissolution for the production of specialty alumina hydrate products.

In another prior art process pressurised industrial oxygen is injected into circulating high temperature digestion liquors (possibly as a side stream, but also possibly in the main stream) to have the effect of conversion of organic impurities to oxidised gaseous species, and dissolved sodium carbonate, simpler organic compounds, and sodium oxalate. This process is always coupled with side stream processes for the removal of products of pressure oxidation, such as by causticisation with lime for the removal of carbonate, and side stream "salting out evaporation" in which a side stream is evaporated essentially to a cake of sodium salts including aluminate, carbonate, oxalate and organic compounds. This cake is either disposed of, or subjected to thermal decomposition for recovery of sodium and alumina values.

Oxalate removal from the circuit is also conducted on a side stream, either the fine seed wash liquors or a stream of solid oxalate made by crystallisation from an evaporated side stream of spent liquor. The oxalate is reacted with lime to produce a calcium oxalate precipitate which is disposed of with red mud or, in the case of solid oxalate, can be thermally decomposed, usually in a process for destruction of other organics contained in concentrated liquors.

Removal of carbonate by reaction with lime is also conducted on a side stream, in this case the wash liquors from solid residue washing.

The difficulty with side stream processing for the removal of organics and their derivatives such as carbonate and oxalate is that side stream processing can only be effective if these impurities have already reached a high level, usually already having a significant nuisance value, in the main liquor circuit through digestion and precipitation. The effectiveness of these processes in purifying liquors is limited because an enduring problem must already exist for these processes to be effective in reducing what would otherwise be a larger problem.

A process involving thermal treatment of a predominantly trihydrate alumina process feedstock at sufficient temperatures to result in partial elimination of organic carbon by pyrolysis and thermal oxidation has been described by Rijkeboer, along with a literature review of the art. In this process trihydrate alumina is dehydrated and the level of organic material which is extractable in. caustic solutions is significantly reduced. Specifically referred to are the patents of Kobayashi and Brown. Each of these prior art documents disclose that such thermal treatments, if properly applied, can result in no loss of alumina extractability compared to the original gibbsitic bauxite. Kobayashi indicates that success lies in maintaining a molar ratio of bound water to alumina (Al2O3) below 0.5. Brown specifically requires temperatures to be maintained in the range 300C. to 400° C. for 10 to 120 minutes. Rijkeboer demonstrates that even with a test for extraction which provides for an optimistic view of extraction in the Bayer process (since it commences with pure caustic soda liquors instead of simulated spent Bayer liquor) the conditions indicated by Brown result in loss of extraction in realistic thermal processing equipment through the conversion of trihydrate alumina in feed to monohydrate alumina in the form of boehmite. Rijkeboer recommends a final temperature range of 400 to 600° C. and a retained chemical water below that of Kobayashi's limitation. He also indicates that a limitation to the process if extractability is not to be adversely affected is that the highest temperature treatment should be conducted at water vapour pressures of less than 2 kPa. This limitation is extreme from an industrial processing point of view, since most industrial fuels will upon combustion to introduce sufficient heat for dehydration at the required temperature produce water vapour levels in combustion gases in excess of 2 kPa. Therefore the only means of conducting the process would be by heat transfer via heating elements which are themselves heated either electrically or via the combustion of fuel. For industrial processes treating at least hundreds of thousands of tonnes (and most probably millions of tonnes) of feed per year the required heat transfer area (of the heating elements) will not result in an economically attractive outcome. Further, the water vapour pressure associated with completion of dehydration of the feed will be higher than 2 kPa unless there is very high dilution with air or some other gas, which even should heating via heating elements be used would result in the generation of large quantities of hot gases from which heat recovery in preheating and drying the feed would not be practical. Consequently none of the thermal processes proposed in the prior art which would have the impact of removal of organic matter accompanied by thermal dehydration while not significantly affecting the extractability of alumina from alumina process feeds can be operated under industrially realistic conditions.

There is also prior art reference (Russell, 1955) to the extraction of monohydrate alumina in the form of boehmite by heating boehmite in air to lower water content forms of hydrated alumina, conducted in such a manner that the product could be dissolved to a greater extent in hot caustic solutions than the original monohydrate alumina. However, since most alumina process feedstocks contain both monohydrate and trihydrate forms, and this prior art did not include conditions for the simultaneous dehydration of monohydrate and trihydrate forms which would not affect the properties of the trihydrate decomposition product, and there was no attempt to ensure that a significant water vapour pressure was present, the disclosure did not in any way overcome the problem identified by Rijkeboer of water vapour sensitivity. This disclosure did not therefore indicate an industrially realistic means of dealing with monohydrate in alumina process feeds, or of removing organic compounds under such industrially realistic conditions.

There is no known industrially realistic prior art process which presents a solution to the problems caused by monohydrate alumina in alumina process feedstocks save for processes which react the alumina process feed with other chemical reagents including soda (or soda ash) and lime (or limestone) at high temperatures. These processes are generally applied to alumina process feeds having high contents of silica which would digest and consume soda as sodium aluminosilicates in the Bayer process operated without this additional step. The processes produce calcium silicates (as by-products) in place of sodium aluminosilicates, and virtually all of the hydrated alumina (both trihydrate and monohydrate) in feed is converted to sodium aluminate. For alumina process feeds containing up to about 10% silica it is generally more economic to apply the Bayer process. That is, for most alumina process feeds these processes come with a significant economic penalty, in capital costs and in energy consumption.

The need for an industrially realistic process which can significantly improve an alumina process feedstock containing both organic carbon and monohydrate alumina so that the many negative implications of these characteristics for alumina refinery complexity and capital costs has been clearly recognised in the prior art. Virtually all processes which have been proposed to meet this need are deficient, either in not completely resolving the alumina refining difficulties, or in coming with a net economic penalty, or in adding net alumina refining complexity, or in being impractical for realistic industrial application in an alumina refining context.

A process which is effective in meeting this need has been identified, but without any of the above deficiencies. It has been surprisingly found that this process is most effectively applied under a particular range of conditions. These conditions would normally limit the thermal efficiency of the identified process, providing a significant economic disadvantage in energy consumption and equipment costs.

Accordingly, the present invention provides improvements in a process for the treatment of an alumina process feedstock for the simultaneous enhancement of achievable alumina digestion per unit of spent liquor and reduction in extractable organic carbon, which improvements optimise process effectiveness or reduce the loss of thermal efficiency without otherwise compromising the effectiveness of the process.

BRIEF DESCRIPTION OF THE DRAWING

The drawing FIGURE is a graph plotting percentage extraction against mean particle size for Test 1 and test 2 discussed herein.

DETAILED DESCRIPTION OF THE PREFERRED EMBODIMENTS

The process to which the present improvements apply includes the following steps:
 (a) heating the alumina process feedstock to a temperature of 400° C. to 650° C. by direct contact with combustion gas, and
 (b) cooling the heated feedstock to a temperature at which it can be handled and fed to the alumina process.

The process also includes controlling the residence time of the alumina process feedstock at temperatures in the above range to ensure decomposition of trihydrate alumina and monohydrate alumina present, by dehydration, while not:
 (i) substantially forming monohydrate alumina from trihydrate alumina, or
 (ii) reducing residual bound water to the extent that extraction is adversely affected, or (iii) allowing sufficient time for contact with water vapour that slower water vapour dependent loss of extractability is experienced, The improvements include:
(i) limiting the maximum temperature of incoming gases to a stage of the process in which the alumina process feedstock reaches the above temperature range of 400 to 650° C. (hereinafter referred to as "the highest temperature stage"), and/or
(ii) limiting the heat input into the highest temperature stage of the process by ensuring that the main thermal load associated with thermal dehydration of the alumina process feedstock is taken up in an earlier stage or stages into which combustion gas, at a temperature above that of the inlet gas of the highest temperature stage, is added.

The present inventors have surprisingly found that by limiting the maximum gas temperature to which the alumina process feedstock is exposed for a given exit temperature in the highest temperature stage while observing other necessary limitations on the exit temperature and the time of exposure of solids to the hot, water vapour bearing gases, then not only can the extractable portion of organic carbon be very significantly reduced, monohydrate alumina largely extinguished and trihydrate alumina converted to a more readily extracted and soluble form, but the optimum extractability of the thus treated alumina process feed in alumina refining processes can also be ensured.

Preferably the maximum gas temperature in contact with solids in the highest temperature stage of the process is less than 750° C.

More preferably the maximum gas temperature in contact with solids in the highest temperature stage of the process is less than 700° C.

Most preferably the maximum gas temperature in contact with solids in the highest temperature stage of the process is less than 680° C.

It has been discovered that the process of the invention is less affected by overheating of fine solids and by the influence of water vapour on the fine fraction of solids in the alumina process feed as the maximum gas temperature is reduced to approach the exit temperature from the highest temperature stage of the process, until for a maximum gas temperature in contact with solids of approximately 660° C. there is little or no measurable effect of increased water vapour pressure or overheating on the fine solids fraction. At higher maximum gas temperatures in contact with solids the extractability of the alumina in the finer fraction is reduced until at temperatures above about 750° C. a significantly detrimental effect on the extractability of alumina in the finer fraction can reduce extractability to be close to that of the original feed. Further, even at maximum gas temperatures as low as 510° C. it is possible to achieve almost complete elimination of monohydrate and trihydrate alumina (forming dehydrated products which are essentially X-ray diffraction amorphous) and to convert the dominant proportion of organic carbon to forms which either enter the off gases or are not extractable and will not form oxalates or carbonates, within sufficiently short contact times (typically less than five minutes) in the highest temperature stage to ensure that water vapour does not significantly reduce the effectiveness of the process.

To achieve the desirable short contact times in contact with water vapour without high gas temperatures in contact with the solids it is beneficial to control the particle size distribution of the alumina process feed which is subjected to heating. For a given contact time larger particle sizes having a larger thermal mass per unit surface area and a larger diameter over which conduction needs to be effective will require higher gas temperatures for the heating effect to penetrate to the core, exposing the outer shells of the particles to higher temperatures in contact with water vapour. At the same time finer particles will quickly be heated, and possibly be overheated, so that the maximum gas temperature in contact with these particles should ideally be lower. Thus, the average particle size of the alumina process feedstock supplied to step (a) should be relatively fine to ensure that particle shells are not overheated or otherwise affected by water vapour. Further, the particle size distribution of the alumina process feedstock supplied to step (a) should be narrow, so that very fine particles are not overheated or otherwise affected by water vapour while the thermal treatment of the cores of the coarser particles is completed. Over grinding is to be avoided, as it is a cost for little return, given that alumina refining processes can usually process feedstocks which would predominantly pass a 1 mm aperture, and the present process can work quite effectively for materials having this size specification. Materials having a coarser specification will normally need to be reground following the present process before feeding to the alumina refining process. Thus the best degree of milling is that which will just suit the desired size specification for the alumina refining process, performed in such a manner that an excessive amount of fine material is not produced.

Preferably the alumina process feedstock is milled so that it contains no more than a few percent by weight, more preferably no more than 5 wt. %, of particles retained on a screen with 5 mm apertures.

More preferably the alumina process feedstock is milled so that it contains no more than a few percent by weight, more preferably no more than 5 wt. %, of particles retained on a screen with 2 mm apertures.

Most preferably the alumina process feed is milled so that it contains no more than a few percent by weight, more preferably no more than 5 wt. %, retained on a screen with 1 mm apertures.

Preferably unless predominantly ground to pass a 100 micron aperture the alumina process feedstock fed to the present process contains no more than about 30% by weight of material which would pass a 20 micron aperture.

More preferably unless predominantly ground to pass a 100 micron aperture the alumina process feedstock fed to the present process contains no more than about 20% by weight of material which would pass a 20 micron aperture.

Most preferably unless predominantly ground to passing a 100 micron aperture the alumina process feedstock fed to the present process contains no more than about 10% by weight of material which would pass a 20 micron aperture.

Milling can be conducted in any suitable device. For example it may be conducted wet or dry, in rod or ball mills, semi-autogenously, in impact crushers such as hammer mills, in rolls or pressure rolls crushers, in roller mills or in vibro-mills. While the desired control of particle size distribution will best be achieved by milling in closed circuit with a classifying device the need for this will depend on the fracture characteristics of the alumina process feed, i.e. the degree to which it has a tendency to be overground in open circuit milling.

If conducted dry, then closed circuit milling will beneficially be carried out in an air swept device, such as a roller mill, a hammer mill, or a rod, ball or semi-autogenous air swept mill. In this manner hot gases from the heating step can be used for drying and milled product transport purposes, with associated economies in equipment and energy costs.

The heating/gas contacting step can be carried out in any device which is suitable for the contacting of fine granular materials with combustion gases mixed with preheated air for short and well controlled contact times followed by gas solids separation. Stationary (bubbling and spouting) fluidised beds will suit the longer contact times and lower maximum average gas temperatures within the suitable range, circulating fluidised beds will suit the intermediate contact times and lower maximum average gas temperatures, and will assist in the control of residence time according to particle size by allowing pneumatic classification prior to circulation of the coarser solids for recontacting with fresh gases, and flash and cyclone contacting systems, including gas suspension calciners with cyclone preheaters, will suit the shorter contact times and higher maximum average gas temperatures for finer and more narrowly distributed particle sizes.

Further, the final heating and gas contacting of solids within the critical temperature range can be preceded by one or more than one preheating stage which themselves bring about some thermal dehydration, reducing the thermal load, water vapour pressure and the necessary contact time in the subsequent heating and gas contacting stage (a). These preheating stage or stages can optionally be conducted in any of the above devices by contact with the exit gases from the final gas contacting stage or from a later stage of preheating. In this manner countercurrent heat exchange can be conducted, with advantages for process fuel consumption, and the alumina process feedstock can be carefully conditioned so that naturally occurring variations in its properties have less influence on the product of the process. There is no significant practical constraint within the above context on contact time or water vapour pressure in these lower temperature heating steps, although very long times at low temperatures can produce some monohydrate alumina (which will nevertheless still decompose in the final gas contacting step).

An economically significant consequence of limiting the maximum gas temperature to come into contact with solids is that as the maximum gas temperature more closely approaches the desired exit temperature from the highest temperature stage of the process the amount of hot gas added to the process for a given amount of heat transfer to solids in the highest temperature stage increases, resulting in energy consumption beyond that which can be recovered in preheating stages, and in high capital costs to handle the larger gas volumes.

It is herein disclosed that this consequence can be significantly reduced in a multi stage countercurrent process by limiting the amount of dehydration which is performed in the highest temperature stage of the process, which can be achieved without detriment by conducting a greater proportion of the desired dehydration in the preheating stages. It has been surprisingly found that there is much less constraint on the maximum temperature of hot gases freshly entering the process in the preheating stages than on the maximum gas temperature entering the highest temperature stage, if these freshly entering hot gases are diluted with gases exiting the highest temperature stage (as in a countercurrent process) and where these gases are very quickly cooled by the greater rate and degree of dehydration occurring at the temperatures and for the less completely dehydrated solids of the preheating stages. Certainly there is no constraint up to a maximum average temperature of combined fresh gases and gases entering from the highest temperature stage of 750C. For practical purposes this normally will not constrain the temperature of fresh incoming gases at this point to less than about 1500° C. Thus by introducing fresh hot gases, normally combustion gases diluted with air, at a temperature higher than the temperature at which gases are introduced to the highest temperature stage, into the gases entering the last preheating stage, greater thermal dehydration can be achieved in this stage for greater overall thermal efficiency since the total volume of hot gases entering the process can be reduced. It is herein disclosed that the lower extent of dehydration occurring in the highest temperature stage does not within the above constraints exacerbate problems with local overheating or water vapour induced loss of extractability of the finer fraction of the alumina process feedstock and that the higher extent of dehydration occurring in the lower temperature preheating stages does not in any manner affect the extractability of the overall product even though the material has been heated to temperatures and vapour pressures in preheating where conversion of trihydrate alumina to monohydrate alumina might be anticipated. In fact there is no evidence of any greater conversion of trihydrate alumina to monohydrate alumina when the process is conducted in this manner, aimed at improving substantially the economics of the process.

It is also herein disclosed that the maximum temperature of gases to which solids can be exposed in the highest temperature stage without detriment in the present process depends on the previous degree of dehydration of the alumina process feedstock in the preheating stages, with higher degrees of prior dehydration requiring somewhat lower maximum gas temperatures in the high temperature stage. Thus preheating to 7% loss on ignition required maximum gas temperatures in the high temperature stage of less than about 685° C., while preheating to 11% loss on ignition allowed a corresponding maximum gas temperature of up to 750° C. Thus for high monohydrate alumina content feeds, for which dehydration by preheating with exit gases from the final stage is more limited, the benefit in fuel consumption of the use of supplementary heating via introduction of combustion gases into the preheating stages is more limited.

Product cooling can be conducted in any practical manner. It is not necessary to cool to ambient temperature, as some of the heat in the product can be used in heating of alumina refinery liquors, saving some energy. Direct cooling to a suitable temperature (probably 100 to 200° C.) using air which is preheated for process use (either as preheated combustion air, as a heat-carrier from the final stage into preheating stages, or as directly added hot air into preheating or drying stages) will be a most effective manner of product cooling, as indirect cooling techniques require heat transfer across exchange elements, adding significantly to process complexity and equipment costs. However, indirect cooling can be applied without any other necessary disadvantage, if desired, either with or without heat recovery from the cooling fluid.

In another aspect of the present invention it is also possible to divide alumina process feeds according to their suitability for introduction to the process at different points having different conditions. Of the decomposition products of trihydrate alumina and monohydrate alumina it is the decomposition product of trihydrate alumina in alumina processing feedstocks which has the greatest extractability, and whose extractability is the most sensitive to process conditions, including water vapour sensitivity and overheating sensitivity. Thus the most vulnerable component of a feed to loss of potential extractability is the trihydrate alumina in the finer fractions of the feed. Further, trihydrate alumina can be suitably decomposed under milder temperature and contact time conditions than monohydrate alumina, under which conditions its decomposition product is less vulnerable to loss of potential extractability.

In the present process, in which there is heat exchange between hot gases and feed solids, it is possible to select a location in the process of this heat exchange where the gases are sufficiently cool that there is much reduced potential for loss of extractability by use of these gases to decompose a fine trihydrate alumina bearing, or trihydrate alumina rich feed, while at the same time introducing a coarse monohydrate bearing feed to consume heat in the process of decomposition at a higher temperature location. Thus in a cocurrent heating step, such as in a gas suspension or flash calcination device, the temperature sensitive fractions can be introduced downstream from the introduction of the high temperature demanding (e.g. coarse monohydrate bearing) fractions, so that the temperature sensitive fractions are at no point exposed to the highest temperature conditions.

In yet another aspect of the present invention, where there is a mismatch between the short gas/solid contact time necessary for decomposition of trihydrate or monohydrate alumina in the alumina process feedstock and the time required at high temperature for the desired or most effective removal of organic matter it is possible to allow the solids to be retained for additional time at elevated temperature after separation of the product of the highest temperature stage of the process from the water vapour bearing gases, e.g. in an insulated rotary drum, in a high temperature storage silo or in a fluidised bed, prior to cooling. Experience with the presently disclosed process is that longer times at elevated temperatures have the effect of lowering the total carbon content of the product, but have a much smaller influence on the content of carbon which is extractable in the alumina refining process, since even short residence times have the effect of rendering whatever remains of carbon compounds derived from organic matter in the feed resistant to extraction. Therefore it will not normally be necessary or beneficial to incorporate such a holding step into the present process.

It is further herein disclosed that the process and process improvements described herein can be further improved by judicious management of the alumina process feed source. For example, for a feed source having a variable ratio of monohydrate alumina to trihydrate alumina the process will benefit from a degree of blending of the feed source so that the monohydrate alumina content does not exceed a conveniently chosen limit. Since the trihydrate alumina in the feed can be dehydrated at lower temperatures than monohydrate alumina then such blending increases the relative extent of dehydration which can be achieved in preheating for a given finishing temperature, and therefore increases the extent to which hot combustion gases can be introduced into the preheating stages. In this manner there is an overall reduction in energy consumption by use of the opportunity to reduce the total volume of hot gases leaving the process, as disclosed above, which reduction could not be achieved to the same extent should a feed containing a high level of monohydrate alumina be introduced without blending with a trihydrate alumina bearing feed.

The presently disclosed process forms part of the chain of processing of alumina process feedstocks which embraces mining through to finished alumina. Accordingly, in another aspect the present invention provides a Bayer process which includes the presently disclosed process. There will be many modifications of the present invention which can be made to suit the particular characteristics of the feedstock and the installed technology base in this processing chain which will become apparent from the present process description to those skilled in the art of alumina feedstock processing and alumina refining. Other modifications will become apparent from the present process description to those skilled in the art of thermal processing of solid granular material or heat transfer. Such modifications as these are intended to fall within the scope of any appended claims.

EXAMPLES

Example 1

A sample of beneficiated, dried, milled and screened (−1.0 mm+0.3 mm) Weipa bauxite having the composition provided in Table 1 was fed continuously at 11.5 kg per hour to an externally heated 150 mm diameter laboratory fluidised bed which was fluidised with preheated air. The fluidised bed discharged by overflow, and the product was immediately collected in an enclosed vessel, and allowed to cool.

TABLE 1

| Weipa Bauxite Feed In Example 1 | |
|---|---|
| % Al2O3 | 56.0 |
| % SiO2 | 2.8 |
| % LOI | 24.7 |
| % Fe2O3 | 13.2 |

The weight of solids in the fluidised bed, expressed on a feed basis, was determined as 2.5 kg, for an average solids residence time in the fluidised bed of about 5 minutes. The fluidised bed was maintained at a constant temperature. The fluidising air was introduced at a rate sufficient to provide a superficial velocity across the bed diameter of 0.7 metres per second at the bed temperature. Water was deliberately injected into the base of the fluidised bed to produce a water vapour pressure in the fluidising gases of 10 kPa.

Tests were performed at temperatures of 511, 540, 570 and 598° C. The properties of the products of the decomposition tests were as recorded in Table 2.

TABLE 2

| Products In Example 1 | | | | |
|---|---|---|---|---|
|  | Test 1 | Test 2 | Test 3 | Test 4 |
| Gas Temperature, ° C. | 511 | 540 | 570 | 598 |
| % Al2O3 | 71.3 | 72.3 | 72.1 | 72.6 |
| % SiO2 | 3.5 | 3.6 | 3.7 | 3.7 |
| % LOI | 4.4 | 3.5 | 3.1 | 2.4 |
| % Fe2O3 | 16.6 | 16.9 | 16.8 | 16.8 |
| % Extraction | 84.0 | 83.5 | 79.0 | 79.8 |

A weighed sample of each of the products was introduced into a small pressure vessel with 100 mL of synthetic spent Bayer liquor (caustic strength 280 gpL, expressed as sodium carbonate, sodium carbonate strength 30 gpL, alumina concentration 112 gpL A2O3). The amount of sample added depended on its chemical analysis, and was determined in such a manner that if all of the alumina available for digestion was to be digested then the final alumina concentration would be in gpL 74% of the final caustic strength in gpL. The cylindrical pressure vessel was then sealed and heated to a contents temperature of 175C. for 30 minutes, during which time it was rotated circumferentially at 70 rpm. At the end of this time the vessel was quenched in a flow of cold water, and the contents were subjected to solid/liquid separation, with the solids washed, weighed and chemically analysed. From the analysis the extent of extraction of the alumina which was available for extraction was determined. This value is recorded in Table 2. No trihydrate alumina, monohydrate alumina or other crystalline decomposition product of monohydrate or trihydrate alumina was detectable by X-ray diffraction in any of the products of processing or the digestion residues.

This example demonstrates the effect of processing temperature on alumina extractability. For a temperature of 540° C. the extraction is similar to that for the 511° C. test. However, for processing temperatures of 570 and 598° C. the extraction is dramatically reduced. The milled feed used for these tests was screened to remove all of the sub 0.3 mm material. That is, the most temperature sensitive material had been removed.

Example 2

A sample of beneficiated, dried and milled Weipa bauxite having the composition essentially the same as that in Example 1 and the particle size analysis provided in Table 3 was fed continuously at 40 kg per hour to an externally heated 150 mm diameter pilot flash tube calciner in which it was conveyed for a distance of 9.8 metres with preheated air produced by mixing air with the combustion products of propane. At four points along the length of the flash tube (at 1.8 m, 3.8 m, 6.0 m, and 7.1 m) further propane burners were used to introduce hot combustion gases to compensate for heat losses in this small scale equipment. The product solids which were separated from the flash calciner discharge gases by cyclone were collected in a 200 L drum and allowed to cool.

TABLE 3

Weipa Bauxite Feed In Example 2

| | |
|---|---|
| % Al2O3 | 56.0 |
| % SiO2 | 2.8 |
| % LOI (bound water) | 24.7 |
| % Fe2O3 | 13.2 |
| | Cum % retained |
| +1 mm | 2% |
| +0.5 mm | 33% |
| +0.1 mm | 72% |
| +0.02 mm | 87% |

The contact time of the solids in this system was similar to the gas residence time, which itself depended on the average gas velocity. The Weipa bauxite, which contains both monohydrate and trihydrate forms of alumina, was passed through this arrangement twice, once at lower temperatures for preliminary dehydration, as would occur in feed preheaters, and once at higher temperatures for completion of dehydration to produce the desired product. In each pass an average gas velocity of 8 metres per second was used. The gas/solids contact time for each pass was therefore 1 to 2 seconds.

In the first pass gas temperatures did not exceed 700° C. while in the second pass the gas entered the flash tube at 748° C. and exited at 601° C. In both passes water was deliberately injected into the combustion gases of the flash tube to produce a water vapour pressure in the incoming gases of 26 kPa.

The product of the first pass retained 10.5% LOI, while the product of the second pass retained 3.8% LOI. This final product was subjected to digestion testing in the same manner as that described in Example 1, for an extraction of available alumina of 88.8%. No trihydrate alumina, monohydrate alumina or other crystalline decomposition product of monohydrate or trihydrate alumina was detectable by X-ray diffraction in either the product of processing or the digestion residue.

This test was repeated with similar conditions for the first pass through the flash tube (dehydration to 10.5% LOI) but the inlet gas temperatures for the second pass was increased to 771° C. The outlet gas temperature was relatively unchanged at 602° C. The product from the second pass had an LOI of 4.0% and an extraction of 84.0% of the available alumina as measured in the digestion test described earlier.

In the repeat test there was similarly no trihydrate alumina, monohydrate alumina or other crystalline decomposition product of monohydrate or trihydrate alumina detectable by X-ray diffraction in either the product of processing or the digestion residue.

The important conclusion from this test when compared with the test in Example 1 is that in systems having very short gas/solids contact times at temperatures up to 750° C. there is no significant detrimental effect on product properties, particularly extractability, due to the maximum temperature to which the solids are exposed. Very short contact times allow a higher maximum gas temperature to be used, without harming alumina extractability, than is possible for longer contacting time (in the order of minutes). However, as shown in this example, for an inlet gas temperature of 771° C. there was a decrease in extraction compared to the 748° C. run. Thus, even at very short gas/solids contacting times there is still an upper limit to the temperature to which the solids can be exposed without having a deleterious effect on extractability. This maximum temperature is a function of the gas/solids contacting time and the degree of dehydration of the bauxite contacting the hottest gas.

Example 3

The same beneficiated, milled and dried bauxite as was used in Example 2 was processed at 0.6 tonne per hour feed rate through a countercurrent gas contacting arrangement consisting of three flash preheating tubes, with gas/solids separation between stages by cyclones, followed by a flash calciner, also equipped with a cyclone for gas/solids separation. The gases from the flash calciner were conducted after gas/solids separation to the third flash preheating tube for mixing with solids from the second flash heating stage, and then, after further gas/solids separation to the second flash preheating tube for mixing with the solids from the first flash heating stage, and finally, following yet another step of gas/solids separation, to the first flash preheating tube for mixing with fresh feed. Solids from earlier stages were conducted by gravity feed from locking valves at the bottom of the cyclones to the next flash heating stage.

The process was controlled to provide an average gas velocity in the flash calciner of 6 metres per second for an incoming gas temperature of 685° C., a calciner exit gas temperature of 630° C., and an average temperature of about 646° C., and for a water vapour pressure in incoming gas of 20 kPa. The preheated material fed to the flash calciner contained 11.9% of chemically bound water, and was at a temperature of approximately 316° C. The gas residence time in the flash calciner was calculated as less than 1 second. The product was not substantially different in properties from the products of calcination described in Example 2, having an extractability above 85%. The extraction for various size fractions of the product are shown in FIGURE 1 (see the data labelled Test 1). Note that the finer particles gave lower extractions than the intermediate sized ones due to overheating of the fines. The low extraction of the coarser particles may be due to mineralogical differences across the particle size distribution or particle size dependent differences in residence time in the flash calciner.

The test was then repeated but this time with a lower inlet gas temperature of 674° C. and a more highly dehydrated feed to the flash calciner (9.4% LOI). FIG. 1 shows extraction plotted against particle size for the product from this run (Test 2). A lower LOI material entering the flash calciner was obtained by increasing the gas temperature in the final pre-heating cyclone. This additional dehydration in the pre-heating cyclones was achieved by increasing the amount of fresh combustion gas mixed with the flash calciner outlet gas at the inlet to the final pre-heating cyclone.

This example demonstrates that it is possible to improve the extractability of the fine fraction of the material without detriment to the coarse fraction by lowering the temperature of the gas entering the flash calciner, i.e. reducing the maximum temperature to which solids are exposed during the finishing stage in the flash calciner.

What is claimed is:

1. A process for the treatment of an alumina process feedstock prior to transferring the treated feedstock to an alumina process for extracting refined alumina from the treated feedstock, which treatment process includes the following steps:
    (a) heating the alumina process feedstock in a highest temperature stage, to a temperature of 400° C. to 650° C. by direct contact with combustion gas, and
    (b) cooling the heated feedstock to a temperature at which said heated feedstock is suitable for being handled and fed to the alumina process;
    which process further includes controlling the contact time of the alumina process feedstock at temperatures in the highest temperature stage in step (a) to ensure decomposition of alumina trihydrate and alumina monohydrate present, by dehydration, while not:
        (i) forming alumina monohydrate from alumina trihydrate, or
        (ii) reducing residual bound water to a level such that extraction is adversely affected, or
        (iii) allowing sufficient time for contact of the alumina process feedstock with water vapour such that a slower water vapour-dependent loss of extractability is experienced;
        and which process further includes limiting the maximum temperature of incoming gases to said stage of the process in which the alumina process feedstock reaches said highest temperature of 400° C. to 650° C.

2. The treatment process defined in claim 1 further including limiting the heat input into the highest temperature stage of the process by ensuring that a main thermal load associated with thermal dehydration of the alumina process feedstock is taken up in a stage or stages prior to said highest temperature stage, into which combustion gas, at a temperature above that of the combustion gas of the highest temperature stage, is added.

3. The treatment process defined in claim 1 further including preheating the alumina process feedstock prior to supplying the feedstock to step (a).

4. The treatment process defined in claim 3 including preheating the alumina process feedstock to a temperature of less than 400° C. with combustion gas and causing at least partial thermal dehydration of the feedstock and thereby reducing the thermal load, water vapour pressure and the required contact time in step (a).

5. The treatment process defined in claim 4 including diluting the combustion gas with outlet gas from the highest temperature stage and preheating the alumina process feedstock with the resultant gas mixture.

6. The treatment process defined in claim 5 wherein the mixture of the combustion gas and the outlet gas from the highest temperature stage is at a temperature of less than 750° C.

7. The treatment process defined in claim 1 wherein step (a) includes heating the alumina process feedstock to the temperature of 400° C. to 650° C. by direct contact with combustion gas and air.

8. The treatment process defined in claim 7 including producing combustion gas in excess air and supplying the combustion gas and air to step (a).

9. The treatment process defined in claim 1 wherein the maximum gas temperature in contact with said alumina process feedstock in the highest temperature stage of the process is less than 750° C.

10. The treatment process defined in claim 9 wherein the maximum gas temperature in contact with said alumina process feedstock in the highest temperature stage of the process is less than 700° C.

11. The treatment process defined in claim 10 wherein the maximum gas temperature in contact with said alumina process feedstock in the highest temperature stage of the process is less than 680° C.

12. The treatment process defined in claim 1 including milling the alumina process feedstock prior to supplying the feedstock to step (a).

13. The treatment process defined in claim 1 wherein the alumina process feedstock supplied to step (a) contains no more than 5% by weight of material which would be retained on a 5 mm aperture.

14. The treatment process defined in claim 1 wherein the alumina process feedstock supplied to step (a) contains no more than 5% by weight of material which would be retained on a 2 mm aperture.

15. The process defined in claim 1 wherein the alumina process feedstock supplied to step (a) contains no more than 5% by weight of material which would be retained on a 1 mm aperture.

16. The treatment process defined in claim 1 wherein the alumina process feedstock supplied to step (a) contains no more than 30% by weight of a material which would pass a 20 micron aperture.

17. The treatment process defined in claim 1 wherein the alumina process feedstock contains no more than 20% by weight of material which would pass a 20 micron aperture.

18. The treatment process defined in claim 1 wherein the alumina process feedstock contains no more than 10% by weight of material which would pass a 20 micron aperture.

19. The treatment process defined in claim 1 including dividing the alumina process feedstock on the basis of temperature sensitivity or water vapour sensitivity and selectively introducing the divided feedstock streams into step (a).

20. The treatment process defined in claim 13 including introducing a alumina trihydrate fraction of the alumina process feedstock into step (a) where the combustion gas is sufficiently cool so that there is reduced potential for loss of extractability from use of hotter gases to decompose the alumina trihydrate in this fraction.

21. The treatment process of claim 1 performed as part of a Bayer process.

22. The treatment process defined in claim 2 wherein the step of limiting the heat input into the highest temperature stage of the process includes preheating the alumina process feedstock in the earlier stage or stages.

23. The treatment process defined in claim 22 including preheating the alumina process feedstock to a temperature of less than 400° with combustion gas and causing at least partial thermal dehydration of the feedstock and thereby reducing the thermal load, water vapour pressure and the required contact time in step (a).

24. A process for the treatment of an alumina process feedstock prior to transferring the treated feedstock to an alumina process for extracting refined alumina from the treated feedstock, which treatment process includes the following steps:
  (a) heating the alumina process feedstock in a highest temperature stage to a temperature of 400° C. to 650° C. by direct contact with combustion gas, and
  (b) cooling the heated feedstock to a temperature at which said heated feedstock is suitable for being handled and fed to the alumina process; which process further includes controlling the contact time of the alumina process feedstock at temperatures in the highest temperature stage in step (a) to ensure decomposition of alumina trihydrate and alumina monohydrate present, by dehydration, while not:
    (i) forming alumina monohydrate from alumina trihydrate, or
    (ii) reducing residual bound water to a level such that extraction is adversely affected, or
    (iii) allowing sufficient time for contact of the alumina process feedstock with water vapour such that a slower, water vapour-dependent loss of extractability is experienced;
    and which process further includes limiting the heat input into the highest temperature stage of the process by ensuring that a main thermal load associated with thermal dehydration of the alumina process feedstock is taken up in a stage or stages prior to said highest temperature stage, into which combustion gas, at a temperature above that of the combustion gas of the highest temperature stage, is added.

25. The treatment process defined in claim 24 wherein the step of limiting the heat input into the highest temperature stage of the process includes preheating the alumina process feedstock in the stage or stages prior to said highest temperature stage.

\* \* \* \* \*